G. E. BLAYLOCK.
TAG AND CHECKING DEVICE.
APPLICATION FILED JULY 8, 1918.
1,304,150.
Patented May 20, 1919.
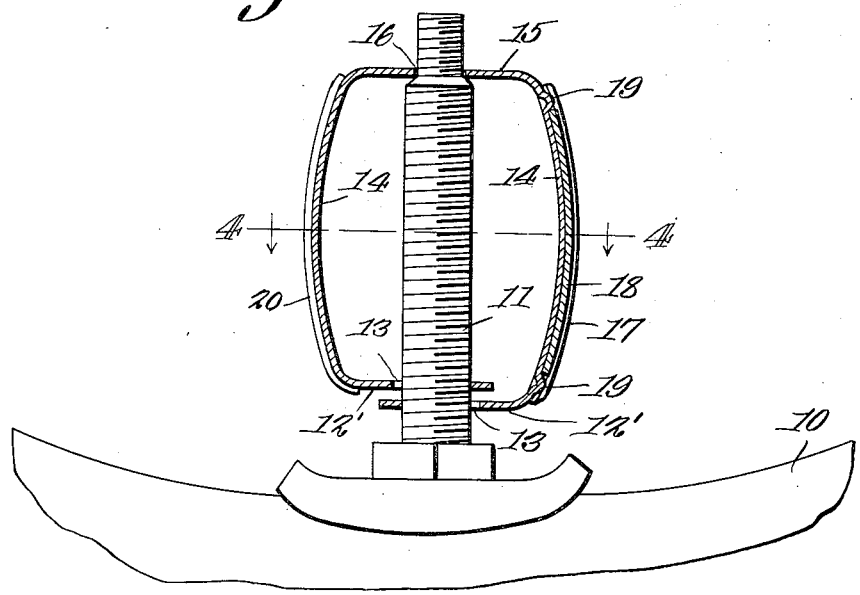
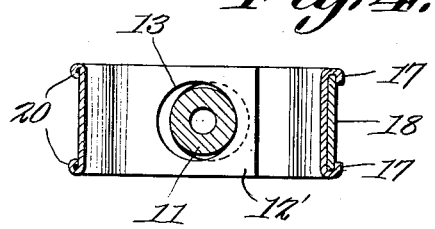
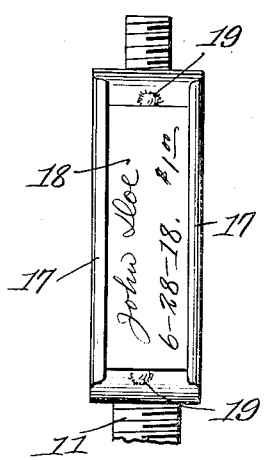
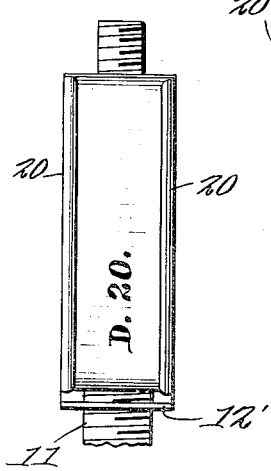
Gifford E. Blaylock
INVENTOR
By Henry J. Brewington,
ATTORNEY

UNITED STATES PATENT OFFICE.

GIFFORD E. BLAYLOCK, OF BALTIMORE, MARYLAND.

TAG AND CHECKING DEVICE.

1,304,150.      Specification of Letters Patent.      Patented May 20, 1919.

Application filed July 8, 1918. Serial No. 243,897.

*To all whom it may concern:*

Be it known that I, GIFFORD E. BLAYLOCK, a citizen of the United States, residing at Baltimore, State of Maryland, have invented certain new and useful Improvements in Tag and Checking Devices, of which the following is a specification.

This invention relates to holders for checks, labels or tags, the same being designed more particularly for attachment to the valve stems of pneumatic tire tubes left with tire repair establishments so that the tubes left for repairs are readily identified, and the owner is sure of the return of his tube which was left for repair.

The invention has for its object to provide a holder of the kind stated which can be easily and quickly attached to the valve stem of the tube, and which is also readily removable when the tube is called for, and which, when the tube is being repaired, is not in the way of the work to be done on the tube.

With the object stated in view, the invention consists in a novel combination and arrangement of parts to be hereinafter described and claimed, and in order that the same may be better understood, reference is had to the accompanying drawing forming a part of this specification.

In the drawing, Figure 1 shows a vertical section of the device applied to the valve stem;

Fig. 2 is an elevation of the device;

Fig. 3 is an elevation showing the other side of the device;

Fig. 4 is a horizontal section on the line 4—4 of Fig. 1, and

Fig. 5 is a plan view of a check having a function to be hereinafter described.

Referring specifically to the drawing, 10 denotes a fragment of the inner tube of a pneumatic tire, and at 11 is shown the valve stem projecting therefrom. When a tube is left with a tire repair establishment for repairs some means must be provided for identifying the same so that the customer will receive back his tube. The invention has therefore been designed to provide a simple and convenient identifying device, the same consisting of a holder which is attached removably to the valve stem 11 and contains an identifying inscription corresponding to the inscription on a check or other token which is handed the owner of the tube to be repaired. Hence, when the owner calls for the tube and presents the check, it is necessary only for the clerk or person in charge to look for a tube having a holder which bears an inscription corresponding to the inscription on the check presented, and the owner therefore is assured of receiving back the identical tube which was left for repair. This check is shown at 12 in Fig. 5.

The holder hereinbefore referred to consists of a strip of resilient metal which is bent into the shape of a loop, with the ends of the strip turned inward, as shown at 12', and here overlapping, said lapping ends being provided with perforations 13, there being one of such in each end portion of the strip. The two side portions 14 of the loop are connected by a transverse connecting portion 15 having midway between its ends a perforation 16. The side portions 14 are resilient and therefore have a normal tendency to spread.

In use, the holder is slipped over the valve stem 11 by pressing the side portions 14 together until the perforations 13 register. The holder can then be placed on the valve stem by passing the latter through said registering perforations, the outer portion of the stem passing through the perforation 16. As the side portions have a normal tendency to spread, it will be evident that the edges of the perforations 13 grip the stem, thereby preventing the device from accidentally slipping off the valve stem, and as the latter is externally screw-threaded, and the edge portions are thin enough to come between the threads, the holder is securely retained in place. The grip on the threads is not sufficient to damage the latter.

One of the sides 14 of the holder has an inscription corresponding to the inscription on the check 12, and the other side is provided with bent over edge portions 17 which form a channel in which is adapted to be placed and held a label or tag 18 containing the owner's name, the cost of the repair job, or any other data. At the end of the channel, are bosses 19 serving as stops for the tag 18.

It will also be noted that the edges of the holder are rolled over, as shown at 20, thereby eliminating sharp edges which might damage the tube when the same is rolled up or folded with the holder therebetween.

The device is simple and inexpensive, and it effectually serves the purpose for which it is designed. It is also strong and durable, and can be used for an indefinite period of time. It will be understood, that when the owner receives his tube, the device is slipped off the valve stem, and it can then be used on another tube.

I claim:

A device of the kind described, comprising a resilient elongated looped member divided at one end, with the end portions thereat inturned and overlapping and provided with perforations adapted to register, the other end of the loop also having a perforation, and the sides of the loop having a normal tendency to spread, and draw the overlapping end portions in opposite directions and in the direction of their length, and one of said sides having a tag holding means.

In testimony whereof I affix my signature in the presence of two witnesses.

GIFFORD E. BLAYLOCK.

Witnesses:
E. WALTON BREWINGTON,
HOWARD D. ADAMS.